(12) United States Patent
Kim

(10) Patent No.: US 9,709,161 B2
(45) Date of Patent: Jul. 18, 2017

(54) SHIFT CONTROL APPARATUS AND SHIFT CONTROL METHOD OF AUTOMATIC TRANSMISSION

(71) Applicant: Hyundai Motor Company, Seoul (KR)

(72) Inventor: Beomsoo Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 237 days.

(21) Appl. No.: 14/557,717

(22) Filed: Dec. 2, 2014

(65) Prior Publication Data

US 2016/0084374 A1 Mar. 24, 2016

(30) Foreign Application Priority Data

Sep. 22, 2014 (KR) .................. 10-2014-0126181

(51) Int. Cl.
*F16H 61/02* (2006.01)
*F16H 61/10* (2006.01)
*F16H 59/66* (2006.01)
*F16H 61/68* (2006.01)
*F16H 59/18* (2006.01)
*F16H 59/70* (2006.01)
*F16H 59/48* (2006.01)
(Continued)

(52) U.S. Cl.
CPC ......... *F16H 61/0204* (2013.01); *F16H 59/66* (2013.01); *F16H 61/10* (2013.01); *F16H 61/68* (2013.01); *F16H 59/18* (2013.01); *F16H 59/44* (2013.01); *F16H 59/48* (2013.01); *F16H 59/70* (2013.01); *F16H 2059/183* (2013.01); *F16H 2059/663* (2013.01); *F16H 2061/0015* (2013.01); *Y02T 10/76* (2013.01)

(58) Field of Classification Search
CPC .......... F16H 59/18; F16H 59/44; F16H 59/66; F16H 59/70; F16H 61/0204; F16H 61/10; F16H 61/68; F16H 2059/183; F16H 2059/663; F16H 2061/0015; F16H 2061/0216; F16H 2061/0218; F16H 2061/0223

See application file for complete search history.

(56) References Cited

U.S. PATENT DOCUMENTS 6,421,596 B2 * 7/2002 Lee ..................... F16H 61/0213
477/120
9,020,714 B2 * 4/2015 Saito ..................... B60W 10/11
701/58

(Continued)

FOREIGN PATENT DOCUMENTS

JP 61-24621 A 2/1986
JP 4322926 B2 6/2009
(Continued)

*Primary Examiner* — Jacob S Scott
(74) *Attorney, Agent, or Firm* — Morgan Lewis & Bockius LLP

(57) ABSTRACT

A shift control apparatus of an automatic transmission may include a data detector configured to detect driving data to perform a shift control, and a vehicle controller configured to determine a shift gear stage based on the driving data and control a transmission based on the shift gear stage, in which the vehicle controller sets driver's demand acceleration based on the driving data, sets a gear stage range which arrives at the driver's demand acceleration, and sets a target gear stage, at which fuel consumption is minimized, in the gear stage range to instruct a shift.

15 Claims, 7 Drawing Sheets

(51) Int. Cl.
  *F16H 59/44*    (2006.01)
  *F16H 61/00*    (2006.01)

(56) References Cited

U.S. PATENT DOCUMENTS

| | | | |
|---|---|---|---|
| 9,056,605 B2* | 6/2015 | Kresse | F16H 61/0213 |
| 9,074,684 B2* | 7/2015 | Yu | F16H 61/68 |
| 2012/0083980 A1* | 4/2012 | Kresse | F16H 61/0213 |
| | | | 701/56 |
| 2016/0047464 A1* | 2/2016 | Tokura | F16H 61/0213 |
| | | | 701/58 |

FOREIGN PATENT DOCUMENTS

| | | |
|---|---|---|
| JP | 2011-207240 A | 10/2011 |
| KR | 10-0373027 B1 | 2/2003 |
| KR | 10-0391724 B1 | 7/2003 |
| KR | 10-2008-0017621 A | 2/2008 |

* cited by examiner

FIG. 2    Pt: POWER REQUIRED AT TIME OF ACCELERATION

| ITEM | APS INCREASE | APS CONSTANT | APS DECREASE |
|---|---|---|---|
| V (EXPECTATION SPEED) INCREASE | ↑ DRIVING FORCE > LOAD, CURRENT SMALL Pt (Pt > 0), (Pt INCREASE) | DRIVING FORCE > LOAD, CURRENT POWER TYPE SATISFACTION (Pt > 0) | ↓ DRIVING FORCE > LOAD, CURRENT LARGE Pt (Pt > 0) (Pt DECREASE) |
| V CONSTANT | ↑ DRIVING FORCE = LOAD, CURRENT VEHICLE SPEED SATISFACTION | DRIVING FORCE = LOAD, CURRENT STATE SATISFACTION (CONSTANT SPEED) (Pt = 0) | ↓ LOAD, CURRENT VEHICLE SPEED SATISFACTION |
| V DECREASE | ↑ DRIVING FORCE < LOAD, CURRENT Pt < 0 DISSATISFACTION (Pt < 0), (Pt INCREASE) | DRIVING FORCE < LOAD, CURRENT Pt (POWER TYPE) SATISFACTION (Pt < 0) | ↓ DRIVING FORCE < LOAD, CURRENT Pt < 0 DISSATISFACTION (Pt < 0) (Pt DECREASE) |

APS = 0 (engine brake)

| ITEM | BPS INCREASE | BPS CONSTANT | BPS DECREASE |
|---|---|---|---|
| V INCREASE | SMALLER ACCELERATION DEMAND (SHIFT DOWN) | CURRENT SATISFACTION | LARGER ACCELERATION DEMAND |
| V CONSTANT | PLAIN → DOWNHILL | CURRENT SATISFACTION | DOWNHILL → PLAIN |
| V DECREASE | LARGER DECELERATION DEMAND | CURRENT SATISFACTION | SMALLER DECELERATION DEMAND |

SHIFT CONTROL APPARATUS AND SHIFT CONTROL METHOD OF AUTOMATIC TRANSMISSION

CROSS-REFERENCE TO RELATED APPLICATION

The present application claims priority to Korean Patent Application No. 10-2014-0126181 filed Sep. 22, 2014, the entire contents of which is incorporated herein for all purposes by this reference.

BACKGROUND OF THE INVENTION

Field of the Invention

The present invention relates to a shift control apparatus of an automatic transmission, and more particularly, to a shift control apparatus and a shift control method of an automatic transmission capable of determining a shift gear stage based on driver's demand acceleration.

Description of Related Art

Generally, a vehicle is provided with a transmission which receives power generated from an engine to control a vehicle speed. The transmission is classified into a manual transmission which is controlled by a driver and an automatic transmission which is automatically controlled based on a vehicle speed.

The automatic transmission controls hydraulic pressure by operating at least one solenoid valve according to a driving state, such as a vehicle speed and a throttle opening, in order to perform shifting to a target gear stage.

The typical method for determining a gear stage based on shift pattern regarding a vehicle speed and a position of an accelerator pedal performs upshifting and downshifting depending on the position of the accelerator pedal when a current vehicle speed is determined. In the case of an engine torque control, when an engine controller determines a torque map, a target engine torque is determined and an engine torque is transferred from engine to a flywheel to be an input torque of the transmission.

However, according to the related art, time is delayed due to oil pressure delay and a clutch control during a process of determining a gear stage of the transmission and as a multi-stage transmission over 10 stages is developed, the number of lines to be expressed by a shift pattern is increased.

Actually, in addition to setting the lines of the shift pattern, in the case of the transmission hydraulic control, factors to be mapped with each of the lines are exponentially increased, and as a result time consumption for the mapping and a burden on check points are increasing.

Further, the method for determining a gear stage based on the shift pattern according to the related art is short of satisfying a driver's demand acceleration. Therefore, to cope with the above problem, another shift pattern map dividing a driving mode into a sport mode, a normal mode, and the like depending on a driver's driving tendency is additionally set.

Further, the related art configures additional shift patterns such as an uphill pattern and a downhill pattern depending on a road gradient condition and therefore has a complicated process of determining a gear stage.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a shift control apparatus and a shift control method of an automatic transmission having advantage of determining a gear stage based on a driver's demand acceleration.

Further, various aspects of the present invention are directed to providing a shift control apparatus and a shift control method of an automatic transmission having advantage of determining driver's demand acceleration by reflecting a road gradient condition.

According to various aspects of the present invention, a shift control apparatus of an automatic transmission may include a data detector configured to detect driving data to perform a shift control, and a vehicle controller configured to determine a shift gear stage based on the driving data and control a transmission based on the shift gear stage, in which the vehicle controller sets driver's demand acceleration based on the driving data, sets a gear stage range which arrives at the driver's demand acceleration, and sets a target gear stage, at which fuel consumption is minimized, in the gear stage range to instruct the shift.

The vehicle controller may set a basic demand acceleration map representing a demand acceleration for a vehicle speed and a position of an accelerator pedal and apply weight values for a change rate of the position of the accelerator pedal and a road gradient condition, respectively, of the driving data to the basic demand acceleration map to define the driver's demand acceleration map.

The vehicle controller may extract the demand acceleration matching the vehicle speed and the position of the accelerator pedal of the driving data from the driver's demand acceleration map to set the driver's demand acceleration.

The vehicle controller may set a gear stage range arriving at the driver's demand acceleration among all the gear stages on an acceleration map representing vehicle speeds and accelerations arriving at each of a plurality of gear stages of the vehicle based on the current gear stage.

The vehicle controller may set the target gear stage, at which fuel consumption is minimized, on a brake specific fuel consumption (BSFC) map representing fuel consumption rate information in a contour form.

The vehicle controller may set the target gear stage, delay a shift during a delay time, and then control the transmission to perform the shift based on the target gear stage.

The driving data may include at least one of a vehicle speed, a position of an accelerator pedal, a change rate of the position of the accelerator pedal, a vehicle acceleration, a road gradient condition, and a driving condition classifying table.

According to various aspects of the present invention, a shift control method of an automatic transmission may include defining a driver's demand acceleration map by a vehicle controller for a vehicle speed and a position of an accelerator pedal based on driving data, setting driver's demand acceleration by the vehicle controller depending on the driving data using the driver's demand acceleration map, setting a gear stage range by the vehicle controller arriving at the driver's demand acceleration among all the gear stages based on a current gear stage of a vehicle, setting a target gear stage, by the vehicle controller at which fuel consumption is minimized, in a gear stage range; and performing a shift based on the target gear stage.

The defining of the driver's demand acceleration map may include setting a basic demand acceleration map by the vehicle controller representing the demand acceleration for the vehicle speed and the position of the accelerator pedal, and applying a weight value by the vehicle controller for at least one of a change rate of the position of the accelerator pedal and a road gradient condition of the driving data to the basic demand acceleration map to define the driver's demand acceleration map.

In the setting of the driver's demand acceleration, the demand acceleration matching the vehicle speed and the position of the accelerator pedal of the driving data may be extracted from the driver's demand acceleration map and may be set.

The setting of the driver's demand acceleration may include determining whether the position of the accelerator pedal of the driving data is equal to or more than a correction variable, and setting the driver's demand acceleration when the position of the accelerator pedal of the driving data is less than the correction variable.

In the setting of the gear stage range, the gear stage range arriving at the driver's demand acceleration among all the gear stages may be set on an acceleration map representing vehicle speeds and accelerations arriving at each of a plurality of gear stages of the vehicle based on the current gear stage.

The setting of the target gear stage may include determining a fuel consumption minimum point at which fuel consumption is minimized, in the gear stage range on a brake specific fuel consumption (BSFC) map representing fuel consumption rate information in a contour form, and confirming a gear stage corresponding to the fuel consumption minimum point to set the target gear stage.

In the performing of the shift based on the target gear stage, performing the shift based on the target gear stage after the shift may be delayed for a delay time.

The driving data may include at least one of the vehicle speed, the position of the accelerator pedal, a change rate of the position of the accelerator pedal, a vehicle acceleration, a road gradient condition, and a driving condition classifying table.

According to various aspects of the present invention, a shift control method of an automatic transmission may include setting a basic demand acceleration map, by a vehicle controller, representing a demand acceleration for a vehicle speed and a position of an accelerator pedal, detecting driving data, by the vehicle controller, representing a driving state of a vehicle and a driver's will, applying a weight value, by the vehicle controller, for the driving data to the basic demand acceleration map to define a driver's demand acceleration map, setting driver's demand acceleration, by the vehicle controller, depending on the driving data using the driver's demand acceleration map, setting a gear stage range by the vehicle controller, arriving at the driver's demand acceleration among all the gear stages based on a current gear stage of the vehicle on an acceleration map, setting a target gear stage, by the vehicle controller, at which fuel consumption is minimized, in the gear stage range on a brake specific fuel consumption (BSFC) map, and performing a shift by the vehicle controller, based on the target gear stage.

In the setting of the driver's demand acceleration, the demand acceleration matching the vehicle speed and the position of the accelerator pedal of the driving data may be extracted from the driver's demand acceleration map and may be set.

In the performing of the shift based on the target gear stage, the shift may be performed based on the target gear stage after the shift is delayed for a predetermined delay time.

The acceleration map may represent the vehicle speed and the acceleration which arrive at each of a plurality of gear stages of the vehicle.

The driving data may include at least one of the vehicle speed, the position of the accelerator pedal, a change rate of the position of the accelerator pedal, a vehicle acceleration, a road gradient condition, and a driving condition classifying table.

According to various embodiments of the present invention, it is possible to reflect the driver's driving tendency since the shift gear stage is determined by calculating the driver's demand acceleration in real time and it is possible to improve the robustness of the system control by saving the mapping time and reducing the checking points of the mapping factors since the operation of mapping the transmission pattern lines with the oil pressure for each line need not be performed.

Further, it is possible to determine the shift gear stage without adding the separate transmission pattern map depending on the road gradient condition since the driver's demand acceleration is determined by reflecting the road gradient condition and it is possible to complement the driving force and the acceleration performance for the gradient condition experienced on the actual road.

Further, it is possible to provide the convenient drivability since the shift is performed without the sudden change of the accelerator pedal.

Further, the effects which may be obtained or predicted by various embodiments of the present invention will be directly or implicitly disclosed in the detailed description of the exemplary embodiments of the present invention. That is, various effects which are predicted by various embodiments of the present invention will be disclosed in the detailed description to be described below.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an exemplified diagram illustrating a driving condition classifying table according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
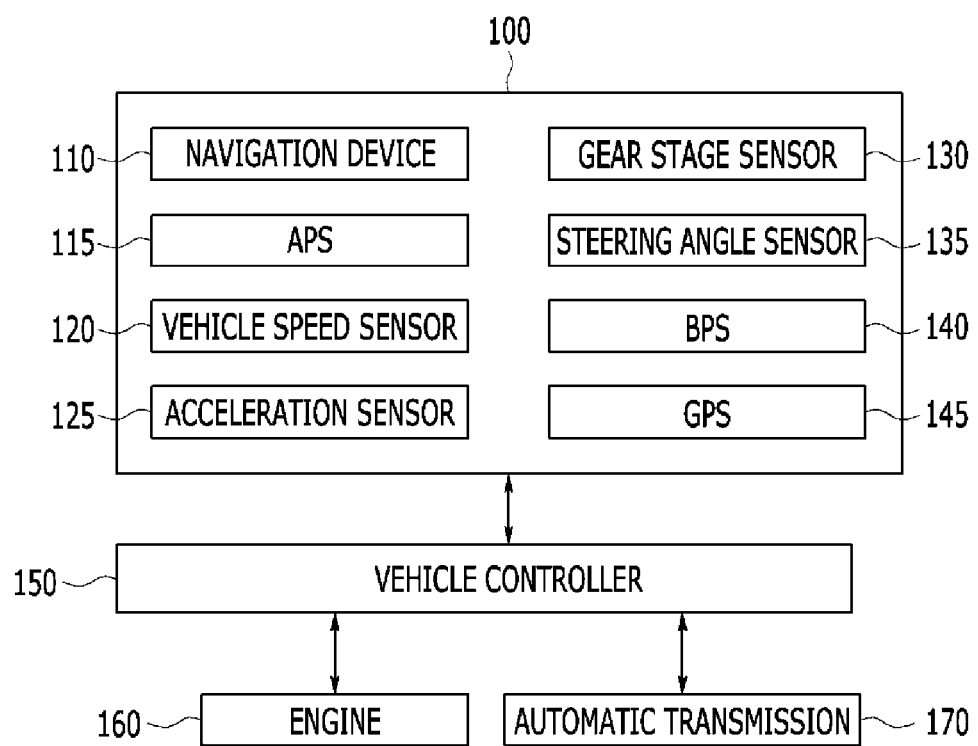
FIG. 1 is a diagram illustrating an exemplary shift control apparatus of an automatic transmission according to the present invention.

FIG. 1 is a diagram illustrating a shift control apparatus of an automatic transmission according to various embodiments of the present invention.

A shift control apparatus of an automatic transmission according to various embodiments of the present invention includes a data detector 100, a vehicle controller 150, an engine 160, and an automatic transmission 170.

The data detector 100 detects driving data to perform a shift control. The data detector 100 provides the detected data to the vehicle controller. For this purpose, the data detector 100 includes a navigation device 110, an accelerator position sensor (APS) 115, a vehicle speed sensor 120, an acceleration sensor 125, a gear stage sensor 130, a steering angle sensor 135, a brake position sensor (BPS) 140, and a global positioning system (GPS) 145.

The navigation device 110 is a device which informs a driver of a route to a destination. That is, the navigation device 110 may generate road guide data from a current position of the vehicle to the destination and provide a route guide to a driver based on the generated road guide data. In this case, the road guide data may include at least one of route data, a road gradient condition for a road, curvature data, speed limit data, and real-time traffic data.

The navigation device 110 may be equipped in the vehicle or may also be configured as a separate device. Further, any type of navigation devices 110 which may inform the driver of the road guide data from the current position to the destination may be used. For example, the navigation device 110 may be any one of a mobile communication terminal and a mobile computer such as a tablet PC, a laptop, and a net book.

The APS 115 detects how much a driver presses an accelerator pedal. That is, the APS 115 detects data associated with a driver's acceleration will. If the accelerator pedal is pressed fully the position of the accelerator pedal is 100%, and if the accelerator pedal is not pressed the position of the accelerator pedal is 0%.

The vehicle speed sensor 120 detects a vehicle speed and may be mounted at a wheel of the vehicle. Meanwhile, when the vehicle speed sensor 120 is not mounted, the vehicle controller 150 may calculate the vehicle speed based on a GPS signal received from the GPS 145.

The acceleration sensor 125 detects a vehicle acceleration. Meanwhile, when the acceleration sensor 125 is not included in the data detector 100, the vehicle controller 150 may calculate the vehicle acceleration by differentiating the vehicle speed detected by the vehicle speed sensor 120.

The gear stage sensor 130 detects a gear stage that is currently engaged.

The steering angle sensor 135 detects a steering angle of the vehicle. That is, the steering angle sensor 135 detects a direction in which the vehicle is progressed.

The BPS 140 detects whether a brake pedal is pressed or not. That is, the BPS 140 detects a driver's acceleration will and a driver's deceleration will along with the APS 115.

The GPS 145 receives a radio wave transmitted from a GPS satellite to determine a position of the vehicle based on a signal therefor. The GPS 145 transfers the signal received from the GPS satellite to at least one of the navigation device 110 and the vehicle controller 150.

The vehicle controller 150 integrally controls the data detector 100, the engine 160, and the automatic transmission 170 and collects and analyzes the information on the data detector 100, the engine 160, and the automatic transmission 170 to control a driving of the vehicle depending on the driver's demand and a state of the vehicle. In this case, the vehicle controller 150 may include an engine control unit (ECU) which controls the general operation of the engine 160 depending on operation states of the engine 160 such as a driver demand torque signal, a cooling water temperature, an engine torque, and the like and a transmission control unit (TCU) which controls the automatic transmission 170 to deliver an output torque of the vehicle to a driving wheel so as to drive the vehicle.

The vehicle controller 150 performs the shift control based on the driving data detected by the data detector 100. In detail, the vehicle controller 150 sets the driver's demand acceleration based on the driving data. Here, the driving data includes the vehicle speed, the position of the accelerator pedal (APS), a change rate of the position of the accelerator pedal (Δ APS), the vehicle acceleration, the road gradient condition, and a driving condition classifying table. The vehicle speed may be confirmed based on the data received from the vehicle speed sensor 120. The position of the accelerator pedal represents how much the driver presses the accelerator pedal and may be confirmed based on the data received from the APS 115. The change rate of the position of the accelerator pedal represents a change rate of the position of the accelerator pedal for a predetermined time and may be calculated based on the data received from the APS 115. The vehicle acceleration may be confirmed from the acceleration sensor 125 or may also be confirmed by differentiating the data received from the vehicle speed sensor 120. The road gradient condition represents a gradient of a road on which the vehicle is driven and may be confirmed based on the data received through the navigation device 110. The driving condition classifying table represents the driver's will depending on the APS and the speed and represents the driver's will depending on the BPS and the speed. The driving condition classifying table may be set as illustrated in FIG. 2.

The vehicle controller 150 sets an allowable gear stage range at the driver's demand acceleration based on the current gear stage. The vehicle controller 150 sets the target gear stage, at which fuel consumption is minimized, in the gear stage range. The vehicle controller 150 performs the shift by controlling the transmission based on the target gear stage.

As such, a method for controlling a shift of an automatic transmission 170 by the vehicle controller 150 will be described in more detail with reference to FIG. 3, FIG. 4, FIG. 5A, FIG. 5B, FIG. 6 and FIG. 7.

Meanwhile, a technology of a shift control of an automatic transmission 170 by the vehicle controller 150 is described herein but is not limited thereto and some processors for the shift control method of an automatic transmission 170 may also be performed by the ECU and other processors may be performed by the TCU.

The engine 160 is controlled to be driven at an optimal driving point depending on the control of the vehicle controller 150.

A shift ratio of the automatic transmission 170 is controlled depending on the control of the vehicle controller 150. The automatic transmission 170 delivers the output torque to the driving wheel to drive the vehicle.

Figure 3:
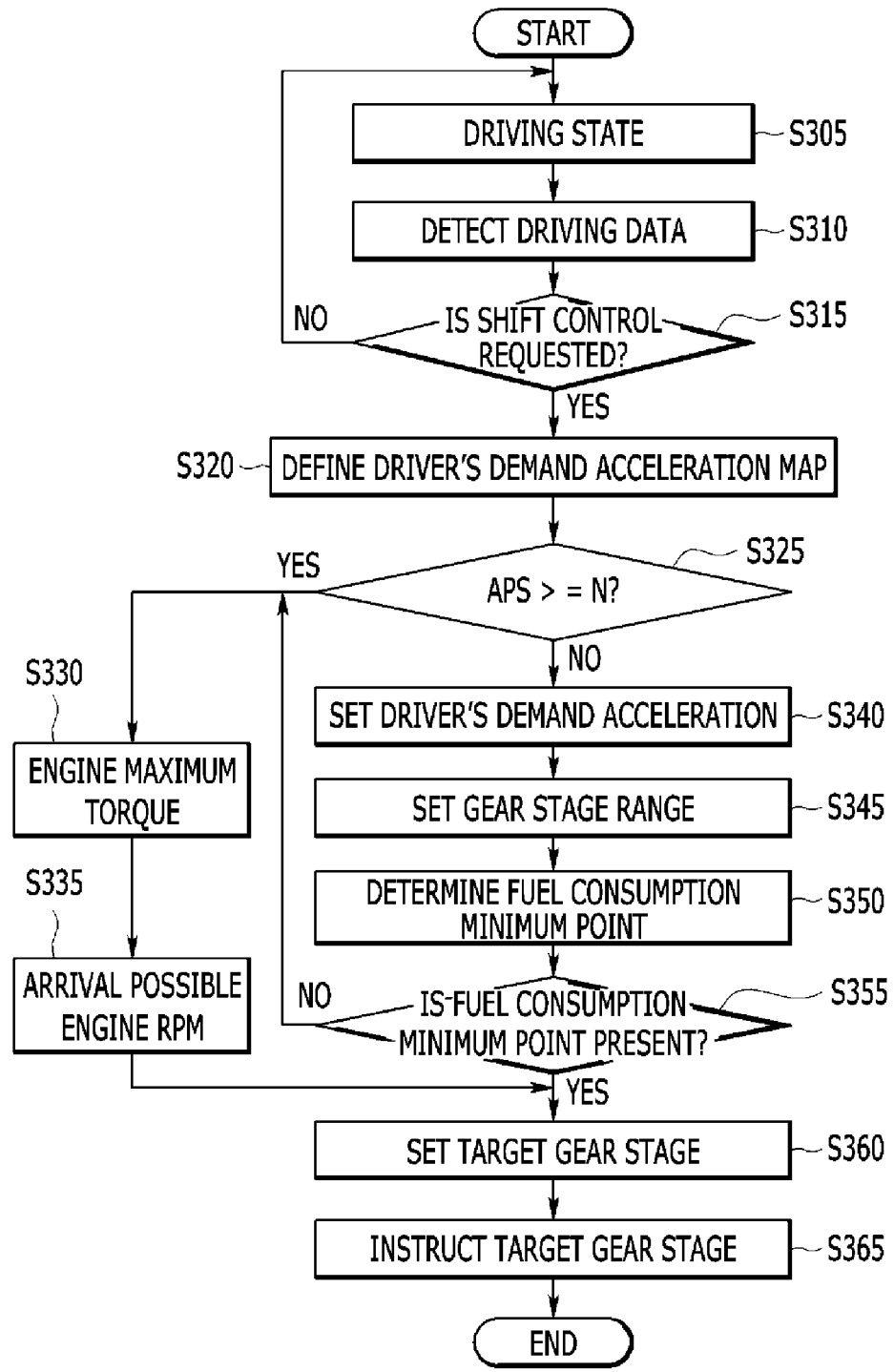
FIG. 3 is a flow chart illustrating an exemplary shift control method of an automatic transmission according to the present invention.

FIG. 3 is a flow chart illustrating a shift control method of an automatic transmission according to various embodiments of the present invention.

In the state in which the vehicle is driven (S305), the vehicle controller 150 detects the driving data (S310). That is, the vehicle controller 150 detects the driving data for performing the shift control from the data detector 100. In this case, the driving data includes at least one of the vehicle speed, the position of the accelerator pedal (APS), the change rate of the position of the accelerator pedal (Δ APS), the vehicle acceleration, the road gradient condition, and the driving condition classifying table.

The vehicle controller 150 determines whether the driver requests the shift control based on the driving data (S315). That is, the vehicle controller 150 confirms a driver's shift will based on the driving data such as the vehicle speed, the position of the accelerator pedal, the change rate of the position of the accelerator pedal, and the vehicle acceleration to determine whether the driver requests the shift control.

Meanwhile, when the vehicle controller 150 does not request the shift control, the process returns to step S305 to detect the driving data in the driving state.

When the vehicle controller 150 requests the shift control, the driver's demand acceleration map is defined based on the driving data (S320). In detail, the vehicle controller 150 sets a basic demand acceleration map representing the demand acceleration changed depending on the vehicle speed and the position of the accelerator pedal.

Here, the basic demand acceleration map is, for example, described as one set in step S325 but is not limited thereto and when the basic demand acceleration map is set prior to defining the driver's demand acceleration map, an order thereof is irrelevant. For example, the basic demand acceleration map may be set in advance by an operator when the vehicle is manufactured.

Figure 4:
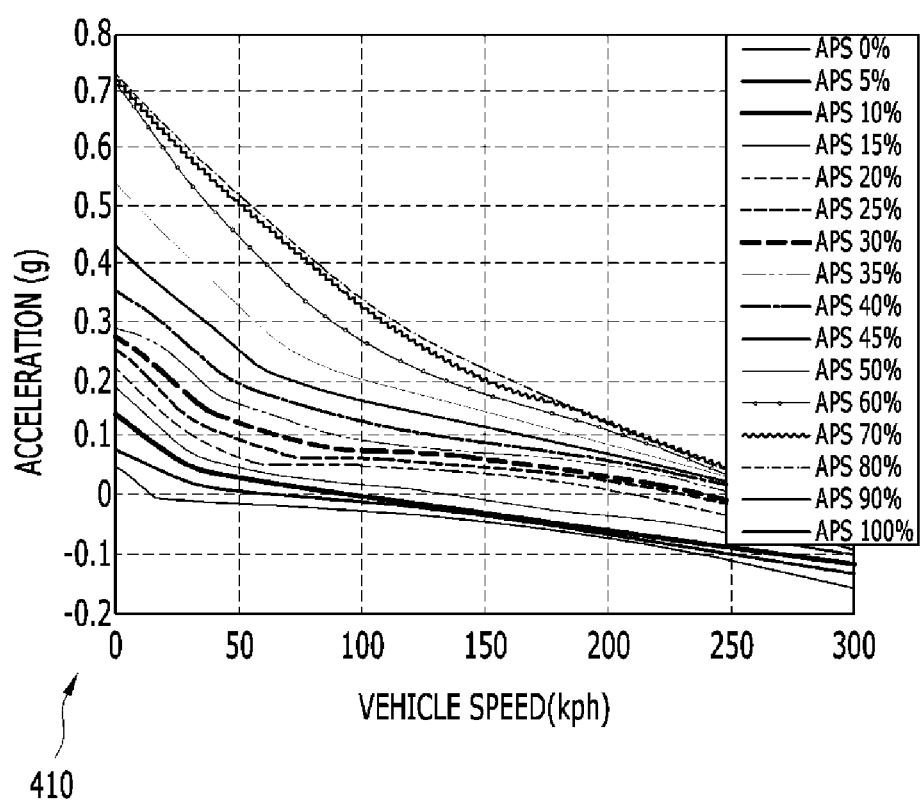
FIG. 4 is an exemplified diagram illustrating a driver's demand acceleration map according to the present invention.

The vehicle controller 150 applies a weight value of the driving data to the basic demand acceleration map to define the driver's demand acceleration map. That is, the vehicle controller 150 applies weight values for the change rate of the position of the accelerator pedal and the road gradient condition to the demand acceleration represented on the basic demand acceleration map to define the driver's demand acceleration map 410 representing the driver's demand acceleration changed depending the vehicle speed and the position of the accelerator pedal as illustrated in FIG. 4. The reason of applying the weight values to the change rate of the position of the accelerator pedal and the road gradient condition is that the driver's demand acceleration is different depending on the change rate of the position of the accelerator pedal and the road gradient. For example, when the change rate of the position of the accelerator pedal is larger than a reference value, driving tendency is sporty and thus the driver wants to fast change the vehicle speed. Therefore, to reflect this, the weight value may be assigned to the basic demand acceleration map. Therefore, the shift control apparatus according to various embodiments of the present invention assigns the weights depending on the change rate of the position of the accelerator pedal and the road gradient condition to the basic demand acceleration map to accurately determine the driver's demand acceleration and may additionally save the mapping time and costs since additional maps for the driver's driving tendency and the road gradient condition need not be configured.

The vehicle controller 150 determines whether the position of the accelerator pedal is equal to or more than a correction variable N (S325). The correction variable N may be preset as 90%, but it is not limited thereto.

Meanwhile, the vehicle controller 150 sets a maximum torque which may be output by the engine 160 when the position of the accelerator pedal is equal to or more than the correction variable N (S330).

The vehicle controller 150 sets the engine RPM which may maximally arrive at each gear stage. Next, the vehicle controller 150 sets the target gear stage based on the engine maximum torque and the engine RPM (S360) and instructs the shift to the target gear stage (S365).

The vehicle controller 150 sets the driver's demand acceleration when the position of the accelerator pedal is less than the correction variable (S340). That is, the vehicle controller 150 extracts the demand acceleration matching the position of the accelerator pedal and the vehicle speed of the driving data from the driver's demand acceleration map and sets the driver's demand acceleration based on the extracted demand acceleration.

Figure 5A:
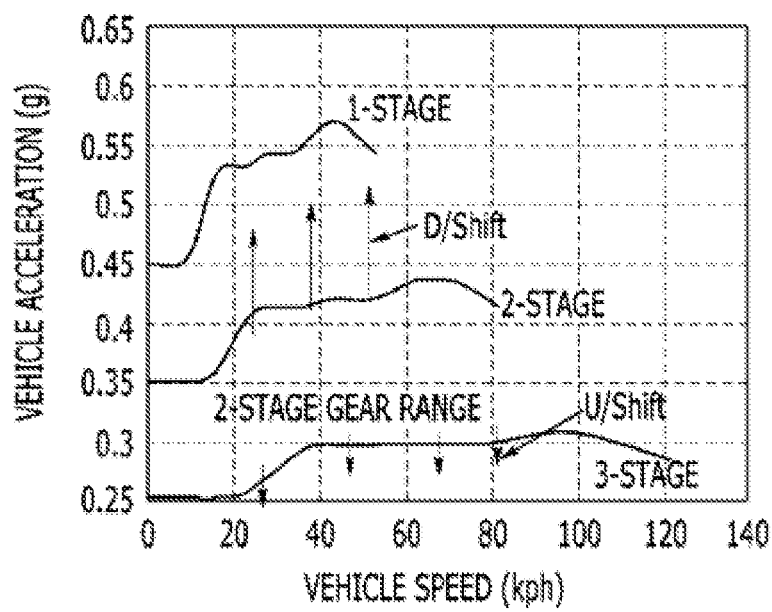
FIG. 5A and FIG. 5B are exemplified diagrams illustrating a vehicle acceleration map according to the present invention.
Figure 5B:
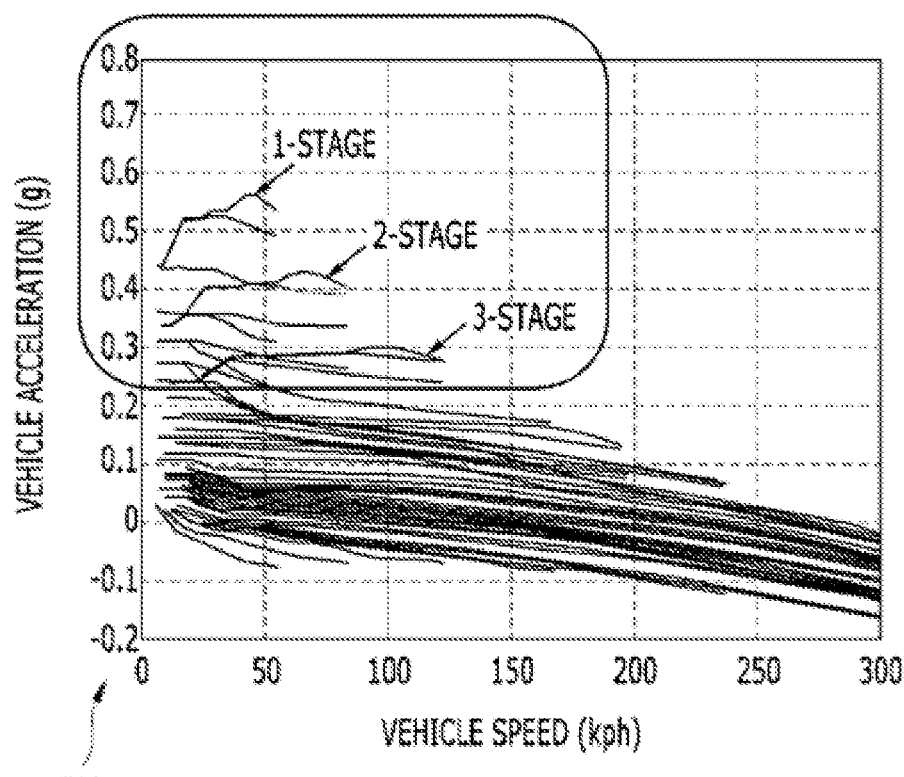

The vehicle controller 150 sets the gear stage range which may arrive at the driver's demand acceleration among all the gear stages based on the current gear stage of a vehicle (S345). In other words, the vehicle controller 150 may confirm the current gear stage of the vehicle by the gear stage sensor 130 of the data detector 100. The vehicle controller 150 sets the gear stage range which may arrive at the driver's demand acceleration among all the gear stages based on the current gear stage on the acceleration map. In this case, as illustrated in FIG. 5A and FIG. 5B, the acceleration map 510 is a map representing the vehicle speed and the acceleration which may arrive at each of the plurality of gear stages. For example, as illustrated in FIG. 5A and FIG. 5B, when the current gear stage is 2-stage and the driver's demand acceleration is between 2-stage and 1-stage, the vehicle controller 150 may set the gear stage range to 1-stage corresponding to a down shift. Further, when the current gear stage is 2-stage and the driver's demand acceleration is between a 4-stage and a 5-stage, the vehicle controller 150 may also set the gear stage range to a 3-stage and the 4-stage corresponding to an up shift.

Figure 6:
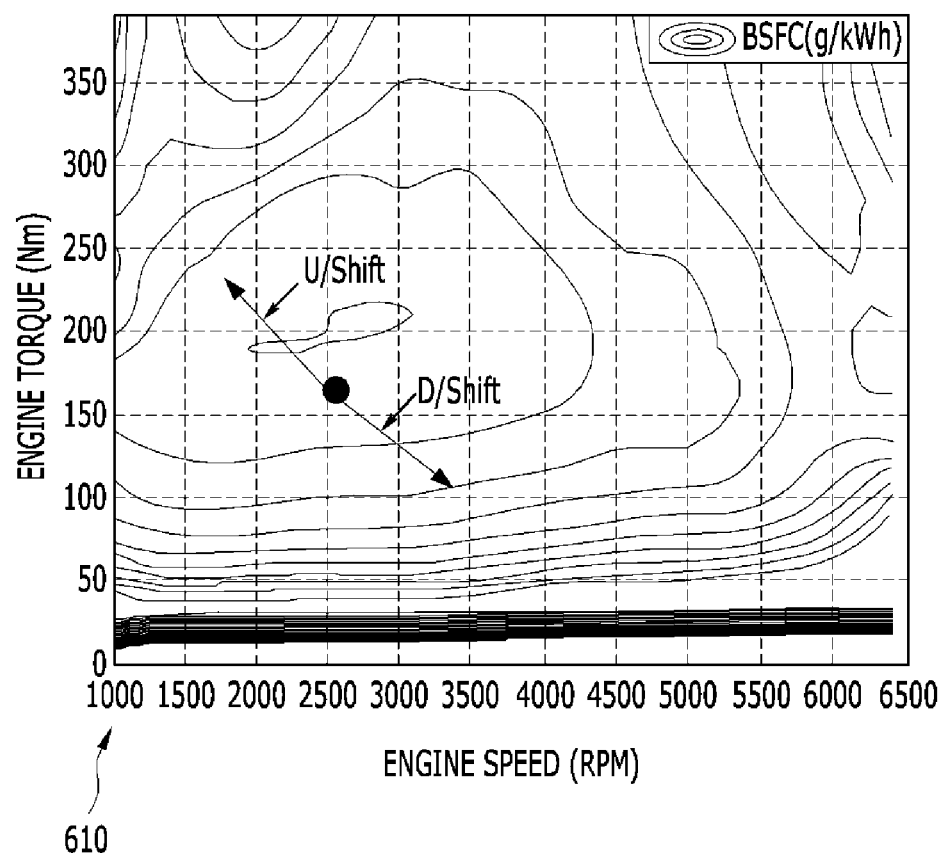
FIG. 6 is an exemplified diagram illustrating a brake specific fuel consumption (BSFC) map according to the present invention.

The vehicle controller 150 sets a fuel consumption minimum point, at which the fuel consumption is minimized, in the gear stage range (S350). In detail, the vehicle controller 150 extracts the engine torque and the engine speed (RPM) which make the fuel consumption minimum in the gear stage range from the BSFC(brake specific fuel consumption) map. The vehicle controller 150 may determine the fuel consumption minimum point based on the extracted engine torque and engine speed. In this case, as illustrated in FIG. 6, the BSFC map 610 is a map which represents fuel consumption rate information in a contour form and represents the BSFC depending on the engine speed and the engine torque. The BSFC which is a value obtained by dividing the fuel consumption rate per hour by power is an index which measures the efficiency of the engine 160

The lower the value of the BSFC, the better the efficiency of the engine 160 becomes.

The vehicle controller 150 determines whether the fuel consumption minimum point is present (S355).

When the vehicle controller 150 does not extract the fuel consumption minimum point from the BSFC map, the process returns to step S330 to be able to set the maximum torque of the engine 160.

When the fuel consumption minimum point is present, the vehicle controller 150 confirms the gear stage corresponding to the fuel consumption minimum point and sets the target gear stage based on the confirmed gear stage (S360).

Figure 7:
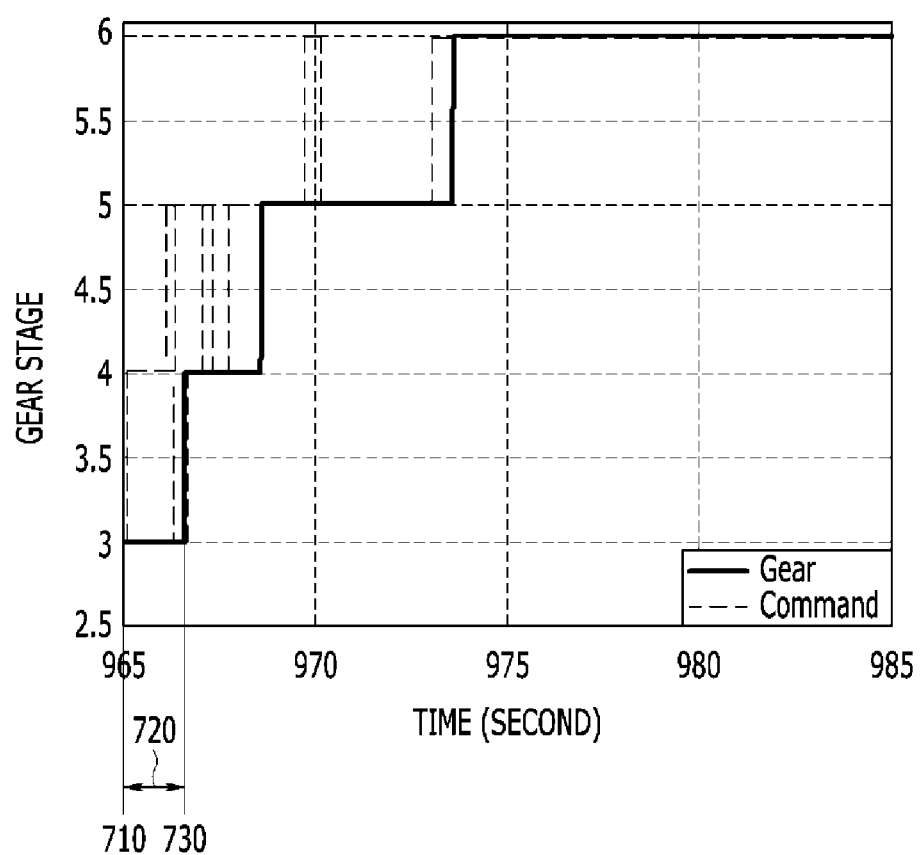
FIG. 7 is an exemplified diagram illustrating a time compensation map according to the present invention.

The vehicle controller 150 instructs the shift based on the target gear stage (S365). That is, the vehicle controller 150 delays the shift for a delay time and then controls the automatic transmission 170 to perform the shift to the target gear stage. For example, as illustrated in FIG. 7, the vehicle controller 150 instructs a shift to the target gear stage at the time corresponding to an arbitrary first time 710 and controls the transmission at an arbitrary second time 730 delayed for a delay time 720 to perform a shift.

As such, the reason of instructing the shift after the shift is delayed for the delay time is to prevent the problem in that the shift may not be made in hardware when the shift is frequently performed.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shift control apparatus of an automatic transmission, comprising:
    a data detector configured to detect driving data to perform a shift control; and
    a vehicle controller configured to determine a shift gear stage based on the driving data and control a transmission based on the shift gear stage,
        wherein the vehicle controller sets driver's demand acceleration based on the driving data, sets a gear stage range which arrives at the driver's demand acceleration, and sets a target gear stage, at which fuel consumption is minimized, in the gear stage range to instruct a shift,
    wherein the vehicle controller sets a basic demand acceleration map representing a demand acceleration for a vehicle speed and a position of an accelerator pedal and applies weight values for a change rate of the position of the accelerator pedal and a road gradient condition, respectively, of the driving data to the basic demand acceleration map to define a driver's demand acceleration map, and
    wherein the vehicle controller extracts the demand acceleration matching the vehicle speed and the position of the accelerator pedal of the driving data from the driver's demand acceleration map to set the driver's demand acceleration.

2. The shift control apparatus of claim 1, wherein the vehicle controller sets the gear stage range which arrives at the driver's demand acceleration among all the gear stages on an acceleration map representing vehicle speeds and accelerations arriving at each of a plurality of gear stages of a vehicle based on a current gear stage.

3. The shift control apparatus of claim 1, wherein the vehicle controller sets the target gear stage, at which fuel consumption is minimized, on a brake specific fuel consumption (BSFC) map representing fuel consumption rate information in a contour form.

4. The shift control apparatus of claim 1, wherein the vehicle controller sets the target gear stage, delays the shift during a delay time, and then controls the transmission to perform the shift based on the target gear stage.

5. The shift control apparatus of claim 1, wherein the driving data includes at least one of a vehicle speed, a position of an accelerator pedal, a change rate of the position of the accelerator pedal, a vehicle acceleration, a road gradient condition, and a driving condition classifying table.

6. A shift control method of an automatic transmission, comprising:
    defining a driver's demand acceleration map by a vehicle controller for a vehicle speed and a position of an accelerator pedal based on driving data;
    setting a driver's demand acceleration by the vehicle controller depending on the driving data using the driver's demand acceleration map;
    setting a gear stage range by the vehicle controller arriving at the driver's demand acceleration among all the gear stages based on a current gear stage of a vehicle;
    setting a target gear stage by the vehicle controller, at which fuel consumption is minimized, in the gear stage range; and
    performing a shift based on the target gear stage,
    wherein the defining of the driver's demand acceleration map includes:
        setting a basic demand acceleration map by the vehicle controller representing the demand acceleration for the vehicle speed and the position of the accelerator pedal; and
        applying a weight value by the vehicle controller for at least one of a change rate of the position of the accelerator pedal and a road gradient condition of the driving data to the basic demand acceleration map to define the driver's demand acceleration map, and
    wherein in the setting of the driver's demand acceleration, the demand acceleration matching the vehicle speed and the position of the accelerator pedal of the driving data is extracted from the driver's demand acceleration map and is set.

7. The shift control method of claim 6, wherein the setting of the driver's demand acceleration includes:
   determining whether the position of the accelerator pedal of the driving data is equal to or more than a correction variable; and
   setting the driver's demand acceleration when the position of the accelerator pedal of the driving data is less than the correction variable.

8. The shift control method of claim 6, wherein in the setting of the gear stage range,
   the gear stage range arriving at the driver's demand acceleration among all the gear stages is set on an acceleration map representing vehicle speeds and accelerations arriving at each of a plurality of gear stages of the vehicle based on the current gear stage.

9. The shift control method of claim 6, wherein the setting of the target gear stage includes:
   determining a fuel consumption minimum point at which fuel consumption is minimized, in the gear stage range on a brake specific fuel consumption (BSFC) map representing fuel consumption rate information in a contour form; and
   confirming a gear stage corresponding to the fuel consumption minimum point to set the target gear stage.

10. The shift control method of claim 6, wherein in the performing of the shift based on the target gear stage, performing the shift based on the target gear stage after the shift is delayed for a delay time.

11. The shift control method of claim 6, wherein the driving data includes at least one of the vehicle speed, the position of the accelerator pedal, a change rate of the position of the accelerator pedal, a vehicle acceleration, a road gradient condition, and a driving condition classifying table.

12. A shift control method of an automatic transmission, comprising:
   setting a basic demand acceleration map, by a vehicle controller, representing a demand acceleration for a vehicle speed and a position of an accelerator pedal;
   detecting driving data, by the vehicle controller, for performing a shift control;
   applying a weight value, by the vehicle controller, for the driving data to the basic demand acceleration map to define a driver's demand acceleration map;
   setting driver's demand acceleration, by the vehicle controller, depending on the driving data using the driver's demand acceleration map;
   setting a gear stage range by the vehicle controller, arriving at the driver's demand acceleration among all the gear stages based on a current gear stage of the vehicle on an acceleration map;
   setting a target gear stage, by the vehicle controller, at which fuel consumption is minimized, in the gear stage range on a brake specific fuel consumption (BSFC) map; and
   performing a shift by the vehicle controller, based on the target gear stage,
   wherein in the setting of the driver's demand acceleration,
      the demand acceleration matching the vehicle speed and the position of the accelerator pedal of the driving data is extracted from the driver's demand acceleration map.

13. The shift control method of claim 12, wherein in the performing of the shift based on the target gear stage,
   the shift is performed based on the target gear stage after the shift is delayed for a predetermined delay time.

14. The shift control method of claim 12, wherein the acceleration map represents the vehicle speed and the acceleration which arrive at each of a plurality of gear stages of the vehicle.

15. The shift control method of claim 12, wherein the driving data includes at least one of the vehicle speed, the position of the accelerator pedal, a change rate of the position of the accelerator pedal, a vehicle acceleration, a road gradient condition, and a driving condition classifying table.

* * * * *